United States Patent
Miyata et al.

(10) Patent No.: US 10,145,378 B2
(45) Date of Patent: Dec. 4, 2018

(54) ROTARY MACHINE

(71) Applicant: MITSUBISHI HEAVY INDUSTRIES COMPRESSOR CORPORATION, Tokyo (JP)

(72) Inventors: Hiroyuki Miyata, Tokyo (JP); Shinichiro Tokuyama, Tokyo (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 233 days.

(21) Appl. No.: 14/898,705

(22) PCT Filed: Sep. 6, 2013

(86) PCT No.: PCT/JP2013/074103
§ 371 (c)(1),
(2) Date: Dec. 15, 2015

(87) PCT Pub. No.: WO2015/033438
PCT Pub. Date: Mar. 12, 2015

(65) Prior Publication Data
US 2016/0123332 A1 May 5, 2016

(51) Int. Cl.
F04D 25/02 (2006.01)
F04D 29/056 (2006.01)
F04D 29/063 (2006.01)
F16H 57/04 (2010.01)
F04D 25/16 (2006.01)
(Continued)

(52) U.S. Cl.
CPC .......... *F04D 25/028* (2013.01); *F04D 17/12* (2013.01); *F04D 25/06* (2013.01); *F04D 25/163* (2013.01);
(Continued)

(58) Field of Classification Search
CPC ........ F04D 25/028; F04D 17/12; F04D 25/06; F04D 29/059; F04D 29/284;
(Continued)

(56) References Cited

U.S. PATENT DOCUMENTS 2,916,312 A * 12/1959 Thomas ................ F16H 57/029
277/429
4,803,896 A * 2/1989 MacGregor ............ B63H 23/10
74/606 R
(Continued)

FOREIGN PATENT DOCUMENTS

JP 57-11397 U 1/1982
JP 59-160919 U 10/1984
(Continued)

OTHER PUBLICATIONS

Written Opinion of the International Searching Authority and International Search Report (Forms PCT/ISA/237 and PCT/ISA/210), dated Dec. 10, 2013, for International Application No. PCT/JP2013/074103, with an English translation.

*Primary Examiner* — Dwayne J White
*Assistant Examiner* — Adam W Brown
(74) *Attorney, Agent, or Firm* — Birch, Stewart, Kolasch & Birch, LLP

(57) ABSTRACT

A rotary machine characterized by being equipped with: a rotary drive part; a drive shaft that is rotated about a horizontally extending axis by the rotary drive part; a large gear that is fixed to the drive shaft; a bearing part that rotatably supports the drive shaft, and to which a lubrication oil is supplied; multiple pinions that are driven by being engaged with the large gear; multiple compression parts that are arranged so as to correspond to the multiple pinions and are respectively rotated by the pinions; and a plate that is installed between the bearing part and the large gear and covers at least a portion of the bottom half of the large gear so as to separate the large gear and the bearing part from each other.

7 Claims, 5 Drawing Sheets

(51) Int. Cl.
*F16C 33/74* (2006.01)
*F04D 17/12* (2006.01)
*F04D 25/06* (2006.01)
*F04D 29/059* (2006.01)
*F04D 29/28* (2006.01)

(52) U.S. Cl.
CPC ......... *F04D 29/056* (2013.01); *F04D 29/059* (2013.01); *F04D 29/063* (2013.01); *F04D 29/284* (2013.01); *F16C 33/74* (2013.01); *F16H 57/04* (2013.01); *F16C 2360/44* (2013.01)

(58) Field of Classification Search
CPC .... F04D 25/163; F04D 29/063; F04D 29/056; F16C 33/74; F16C 2360/44; F16H 57/04; F01D 25/18; F01D 25/183; F01D 25/186
See application file for complete search history.

(56) References Cited

U.S. PATENT DOCUMENTS

| | | | |
|---|---|---|---|
| 5,281,110 A | | 1/1994 | Dreiman |
| 7,704,178 B2* | | 4/2010 | Sheridan ................ F01D 25/18 475/159 |
| 2012/0107099 A1* | | 5/2012 | Jeong ..................... F04D 25/02 415/122.1 |

FOREIGN PATENT DOCUMENTS

| | | | | |
|---|---|---|---|---|
| JP | 9-144692 A | | 6/1997 | |
| JP | 9-144855 A | | 6/1997 | |
| JP | 09144855 A | * | 6/1997 | .......... F04D 25/163 |
| JP | 3735147 B2 | | 1/2006 | |
| KR | 20020078601 A | * | 10/2002 | .......... F04D 25/163 |

* cited by examiner

ROTARY MACHINE

TECHNICAL FIELD

The present invention relates to a rotary machine, and more particularly to a rotary machine having a gear wheel, and a plurality of pinion gears which mesh with the gear wheel to be driven.

BACKGROUND ART

A centrifugal compressor which is a rotary machine allows gas to pass through a rotating impeller in a radial direction and compresses the gas using a centrifugal force generated at this time. The centrifugal compressor is used, for example, in a petrochemical plant, a natural gas plant, or an air separation plant.

As the centrifugal compressor, a single-shaft, multi-stage type centrifugal compressor having a structure in which an impeller which compresses gas is attached to a single shaft, and an accelerator-embedded centrifugal compressor (hereinafter, referred to as a geared compressor) having a structure in which impellers are attached to the shaft ends of a plurality of driven shafts, are known. A type of geared compressor which compresses gas using a plurality of compressing parts having impellers provided at the shaft ends of a plurality of driven shafts is known.

In PTL 1, a geared compressor in which a pinion gear is disposed on the upper side of a gear wheel attached to a driving shaft is described. In order to prevent drain oil discharged from the bearing of the pinion gear from falling on the gear wheel, the geared compressor includes covers provided on both sides of the bearing corresponding to the pinion gear disposed on the upper side.

CITATION LIST

Patent Literature

[PTL 1] Japanese Patent No. 3735147

SUMMARY OF INVENTION

Technical Problem

However, in the rotary machine such as the geared compressor, various loss reductions are attempted.

In a process of examination regarding loss reductions, the inventors found that in a rotary machine having a gear train constituted by a gear wheel and a pinion gear, the adhesion of drain oil discharged from a bearing of a driving shaft to the gear wheel is a factor that causes unexpected loss.

That is, it was found that power loss occurs when the gear wheel is rotated, since the drain oil discharged from the bearing of the driving shaft to which the gear wheel is attached adheres to a side surface of the gear wheel that is rotated. Particularly, in a case of a rotary machine having high power, this loss is noticeable. However, it has been observed that it is difficult to quantitatively estimate the loss, and there is a possibility that higher loss than postulated may be generated.

In the case of the geared compressor described in PTL 1, although the adhesion of the drain oil to the upper half portion of the gear wheel is prevented, the adhesion thereof to the lower half portion of the gear wheel is not prevented, and the drain oil that adheres to the lower half portion of the gear wheel becomes the cause of power loss.

The present invention provides a rotary machine capable of reducing required power by reducing power loss when a gear wheel is rotated.

Solution to Problem

A rotary machine of the present invention includes: a rotational driving part; a driving shaft which is rotated by the rotational driving part about an axis that extends in a horizontal direction; a gear wheel which is fixed to the driving shaft; a bearing section which rotatably supports the driving shaft and is supplied with lubricating oil; a plurality of pinions which mesh with the gear wheel to be driven; a plurality of compressing parts which are provided to correspond to the plurality of pinions and are respectively rotated by the pinions; and a first plate which is disposed between the bearing section and the gear wheel, and covers a region of at least a portion of a lower half of the gear wheel so as to separate the gear wheel from the bearing section.

In this configuration, drain oil discharged from the bearing section is prevented from falling and adhering onto the lower half portion of the gear wheel by the first plate. Accordingly, power loss that occurs due to the adhesion of the drain oil to the gear wheel when the gear wheel is rotated can be reduced.

In the rotary machine, it is preferable that a lower end of the first plate extends further downward than a lower end of the gear wheel.

In this configuration, the adhesion of the drain oil to the gear wheel can be further prevented.

The rotary machine may be configured to further include a second plate which is disposed between an upper half portion of the bearing section and the gear wheel to separate the gear wheel from the bearing section.

In this configuration, the drain oil discharged toward the upper side from the bearing section can be prevented from adhering to the gear wheel by the second plate.

The rotary machine may be configured to further include: a driven shaft bearing section which rotatably supports a driven shaft to which the pinion is fixed; and a third plate which is disposed between a lower half portion of the driven shaft bearing section and the gear wheel to separate the gear wheel from the driven shaft bearing section.

In this configuration, the drain oil discharged from the driven shaft bearing section can be prevented from adhering to the gear wheel by the third plate.

The rotary machine may be configured to further include a casing which supports the bearing section, and the casing may be provided with an oil groove which guides drain oil, which is discharged from the bearing section toward the other side of the bearing section in an axial direction, to one side of the bearing section in the axial direction, on which the first plate is disposed.

Advantageous Effects of Invention

According to the present invention, the drain oil discharged from the bearing section is prevented from falling and adhering onto the lower half portion of the gear wheel by the plate. Accordingly, power loss that occurs due to the adhesion of the drain oil to the gear wheel when the gear wheel is rotated can be reduced.

DESCRIPTION OF EMBODIMENTS

Hereinafter, an embodiment of the present invention will be described in detail with reference to the drawings.

A geared compressor which is a rotary machine of the embodiment of the present invention includes a gear train therein, and has a multi-shaft, multi-stage configuration that drives a plurality of impellers.

Figure 1:
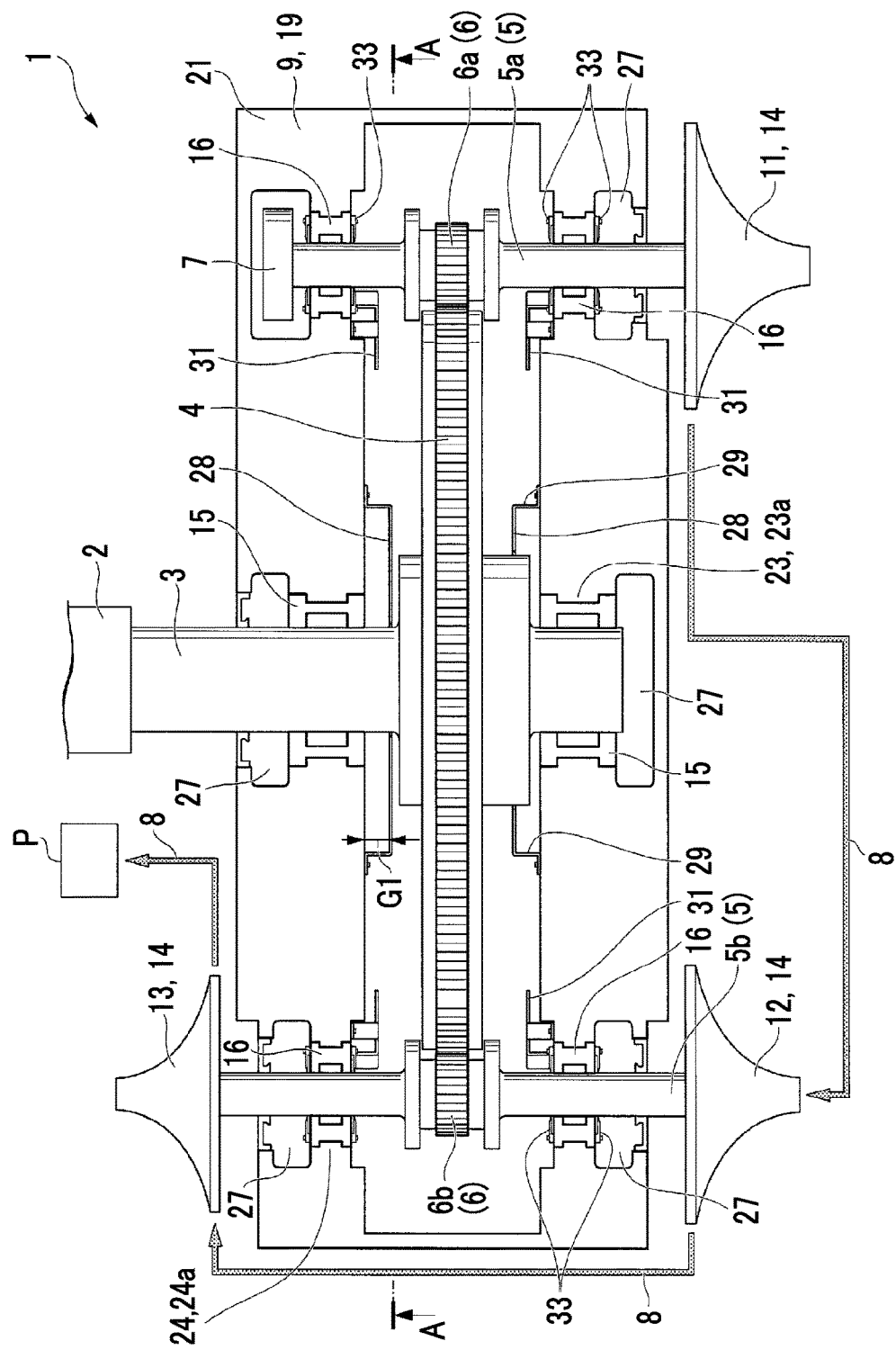
FIG. 1 is a plan view of a geared compressor of an embodiment of the present invention.

As illustrated in FIG. 1, a geared compressor 1 includes a rotational driving part 2 which generates power, a driving shaft 3 which is a rotary shaft that is rotated by the rotational driving part 2 about an axis that extends in a horizontal direction, a gear wheel 4 fixed to the driving shaft 3, two pinion gears 6 which mesh with the gear wheel 4 to be driven, two driven shafts 5 which respectively act as the shafts of the pinion gears 6, and three compressing parts 11, 12, and 13 which are driven by power transmitted to the driven shafts 5.

As the rotational driving part 2, for example, an electric motor may be employed. The gear wheel 4 and the pinion gears 6 constitute a gear train that functions as an accelerator which increases the speed of the driving shaft 3.

The two pinion gears 6 are rotated by the rotation of the gear wheel 4. The two pinion gears 6 are constituted by a lower-pressure-stage pinion gear 6a, and a higher-pressure-stage pinion gear 6b which is smaller than the lower-pressure-stage pinion gear 6a. Therefore, the higher-pressure-stage pinion gear 6b is rotated at a higher rotation speed than that of the lower-pressure-stage pinion gear 6a.

The two driven shafts 5 are constituted by a lower-pressure-stage driven shaft 5a which extends toward both ends of the lower-pressure-stage pinion gear 6a in the central axis direction, and a higher-pressure-stage driven shaft 5b which extends toward both ends of the higher-pressure-stage pinion gear 6b in the central axis direction.

The three compressing parts 11, 12, and 13 are provided to correspond to the pinion gears 6, and are constituted by the first-stage compressing part 11 which is provided at the front end of the lower-pressure-stage driven shaft 5a on the opposite side of a side on which the rotational driving part 2 is provided, the second-stage compressing part 12 which is provided at the front end of the higher-pressure-stage driven shaft 5b, and the third-stage compressing part 13 which is provided at the rear end of the higher-pressure-stage driven shaft 5b. A counterweight 7 is attached to the other end of the lower-pressure-stage driven shaft 5a.

In the following description, the axial directions of the driving shaft 3 and the driven shafts 5 are simply referred to as an axial direction, and a side (upper side in FIG. 1) on which the rotational driving part 2 is provided in the axial direction is referred to as a rear side, while the opposite side (lower side in FIG. 1) of the side on which the rotational driving part 2 is provided in the axial direction is referred to as a front side.

Each of the first-stage compressing part 11, the second-stage compressing part 12, and the third-stage compressing part 13 includes an impeller 14, and a scroll casing (not illustrated) which covers the impeller 14 and has a gas introduction portion and a gas discharge port.

Each of the first-stage compressing part 11, the second-stage compressing part 12, and the third-stage compressing part 13 compresses an operating fluid by using the impeller 14. The impeller 14 discharges the operating fluid suctioned from the gas introduction portion toward the radially outer peripheral side via a passage formed therein. The first-stage compressing part 11, the second-stage compressing part 12, and the third-stage compressing part 13 are connected via pipes 8.

The gear train constituted by the gear wheel 4 and the plurality of pinion gears 6 is accommodated inside a gear casing 9, and the driving shaft 3, the lower-pressure-stage driven shaft 5a, and the higher-pressure-stage driven shaft 5b are rotatably supported by bearings 15 and 16 in the gear casing 9. The bearings 15 and 16 are constituted by the driving shaft bearings 15 which are disposed on the front side and the rear side of the gear wheel 4 in the axial direction, and the driven shaft bearings 16 which are disposed on the front side and the rear side of the pinion gears 6 in the axial direction.

The bearings 15 and 16 are journal bearings (radial bearings) having a plurality of bearing pads 17 (see FIGS. 3 and 4) for supporting the driving shaft 3 and the driven shafts 5. The bearings 15 and 16 include oil supply nozzles (not illustrated) which supply lubricating oil between the shafts and the bearing pads 17. Drain oil which finishes the function as the lubricating oil is discharged toward both sides of the bearing pads 17 in the axial direction.

Figure 2:
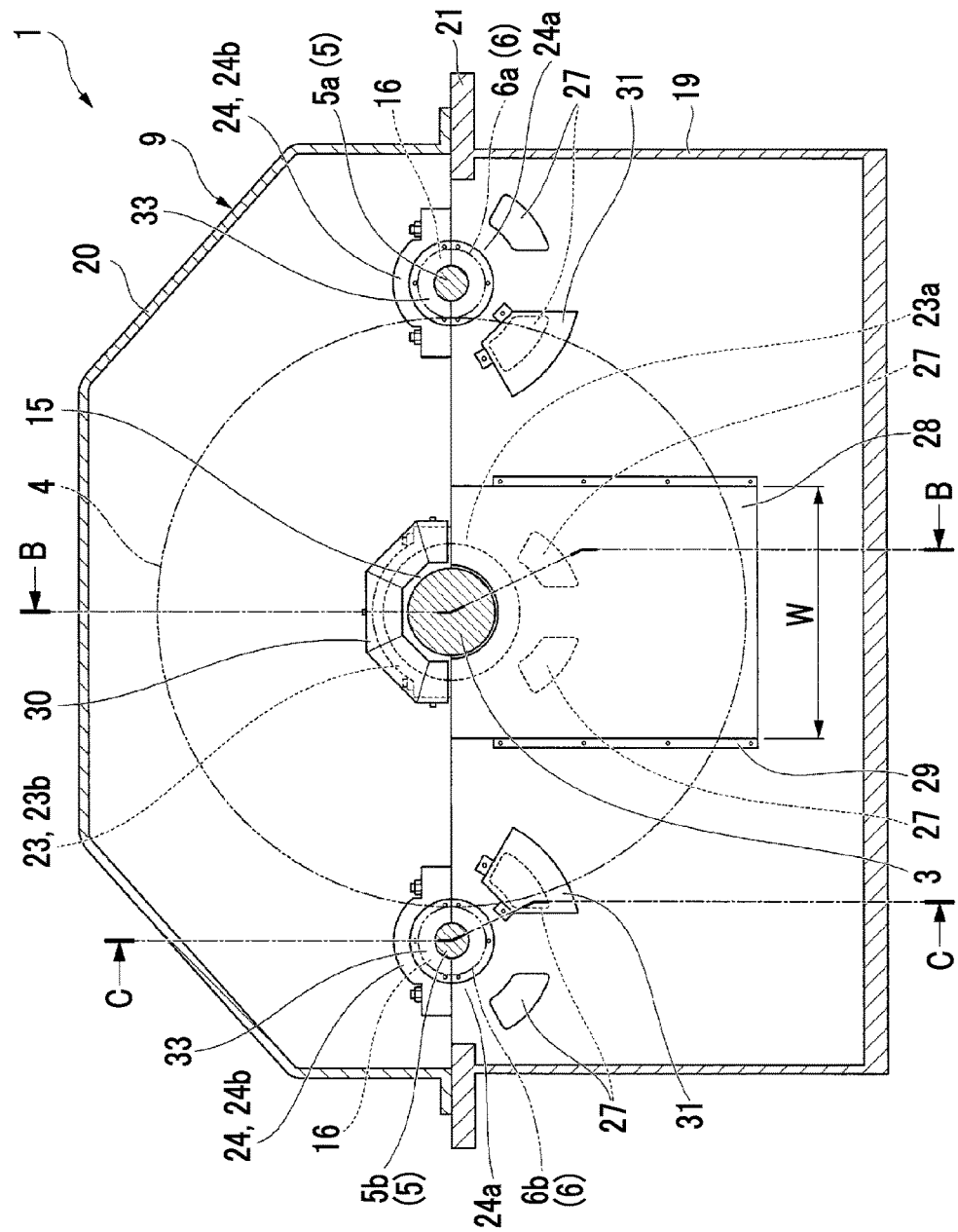
FIG. 2 is a sectional view taken along A-A of FIG. 1, and is a view illustrating the arrangement of baffle plates of the geared compressor.

As illustrated in FIG. 2, the gear casing 9 includes a lower casing 19 of which the upper side is open, and an upper casing 20 which covers the upper side of the lower casing 19. A flanged portion 21 having a shape that extends from the opening in the horizontal direction is formed in the lower casing 19.

The gear casing 9 includes a plurality of bearing fixing parts 23 and 24. The bearing fixing parts 23 and 24 are constituted by the first bearing fixing parts 23 which fix the driving shaft bearings 15, and the second bearing fixing parts 24 which fix the driven shaft bearings 16.

The bearing fixing parts 23 and 24 are constituted by bearing fixing part lower half portions 23a and 24a which are formed integrally with the flanged portion 21 of the lower casing 19, and bearing fixing part upper half portions 23b and 24b which are attached to the upper portions of the bearing fixing part lower half portions 23a and 24a using fastening members such as bolts. The bearing fixing part upper half portions 23b and 24b may also be configured to be integrated with the upper casing 20.

The bearings 15 and 16 are interposed between the bearing fixing part upper half portions 23b and 24b and the bearing fixing part lower half portions 23a and 24a so as to be fixed to the flanged portion 21 of the gear casing 9. The bearing fixing part lower half portions 23a and 24a of the lower casing 19 are provided with oil grooves 27 which act as outflow passages of the drain oil from the bearings 15 and 16.

Here, the structure of the oil grooves 27 will be described with reference to FIG. 3. The oil grooves 27 are formed to guide the drain oil discharged to the opposite side of the gear wheel 4 (the other side in the axial direction) to the gear wheel 4 side (one side in the axial direction). Specifically, the oil grooves 27 are formed so that an upper surface which is the upper surface of the bearing fixing part lower half portion 23a on the opposite side of the gear wheel 4 is communicated with a side surface which is the side surface of the bearing fixing part lower half portion 23a on the gear wheel 4 side.

The geared compressor 1 of this embodiment is provided with a plurality of baffle plates 28, 30, and 31 for preventing the drain oil discharged from the bearings 15 and 16 from adhering to the gear wheel 4. The baffle plates 28, 30, and 31 are formed by performing sheet-metal working on a steel sheet such as SUS304.

Among the plurality of baffle plates, the first baffle plates 28 are disposed on both sides of the gear wheel 4 in the axial direction between the driving shaft bearings 15 and the gear wheel 4 so as to separate the driving shaft bearings 15 from the gear wheel 4.

The first baffle plate 28 is a rectangular plate member which covers the region of at least a portion of the lower half of the gear wheel 4 and has dimensions such that the width dimension W (see FIG. 2) thereof in the horizontal direction perpendicular to the axial direction is sufficiently greater than the diameter of the driving shaft bearing 15 and the first baffle plate 28 sufficiently covers the outlet portion of the oil groove 27 when viewed in the axial direction. The upper end of the first baffle plate 28 is at the same position as the center of the driving shaft 3, and the lower end thereof is positioned at a slightly lower position than the lower end of the gear wheel 4.

Figure 3:
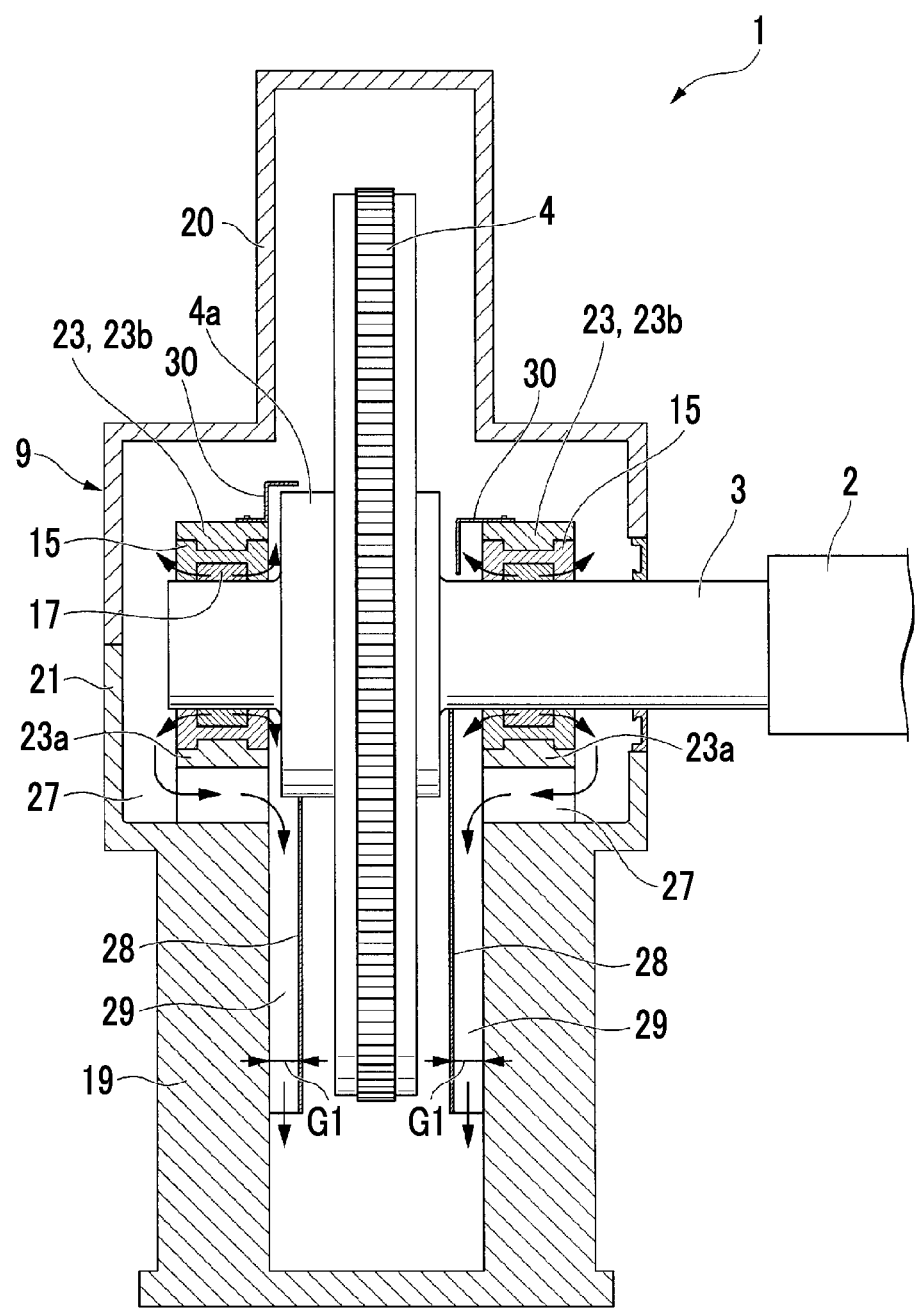
FIG. 3 is a sectional view taken along B-B of FIG. 2, and is a view illustrating the arrangement of first baffle plates and second baffle plates.

As illustrated in FIG. 3, the first baffle plates 28 are fixed to the inner surface of the lower casing 19 via bent portions 29 provided on both sides thereof so as to be separated from the inner surface of the lower casing 19 by a predetermined dimension G1. In addition, the upper portions of the first baffle plates 28 are provided with semicircular cut-outs in order to prevent interference with the driving shaft 3 and the driving shaft bearings 15.

The second baffle plates 30 are disposed between the upper half portions of the driving shaft bearings 15 and the gear wheel 4 to separate the driving shaft bearings 15 from the gear wheel 4. The second baffle plates 30 are attached to the bearing fixing part upper half portions 23b for fixing the driving shaft bearings 15.

In the second baffle plates 30, the second baffle plate on the front side of the gear wheel 4 in the axial direction and the second baffle plate on the rear side of the gear wheel 4 in the axial direction have different shapes. The second baffle plate 30 on the front side in the axial direction is bent toward the upper side from the bearing fixing part upper half portion 23b so as to avoid a boss portion 4a of the gear wheel 4. The second baffle plate 30 on the rear side in the axial direction is bent toward the lower side from the upper end of the bearing fixing part upper half portion 23b.

Figure 4:
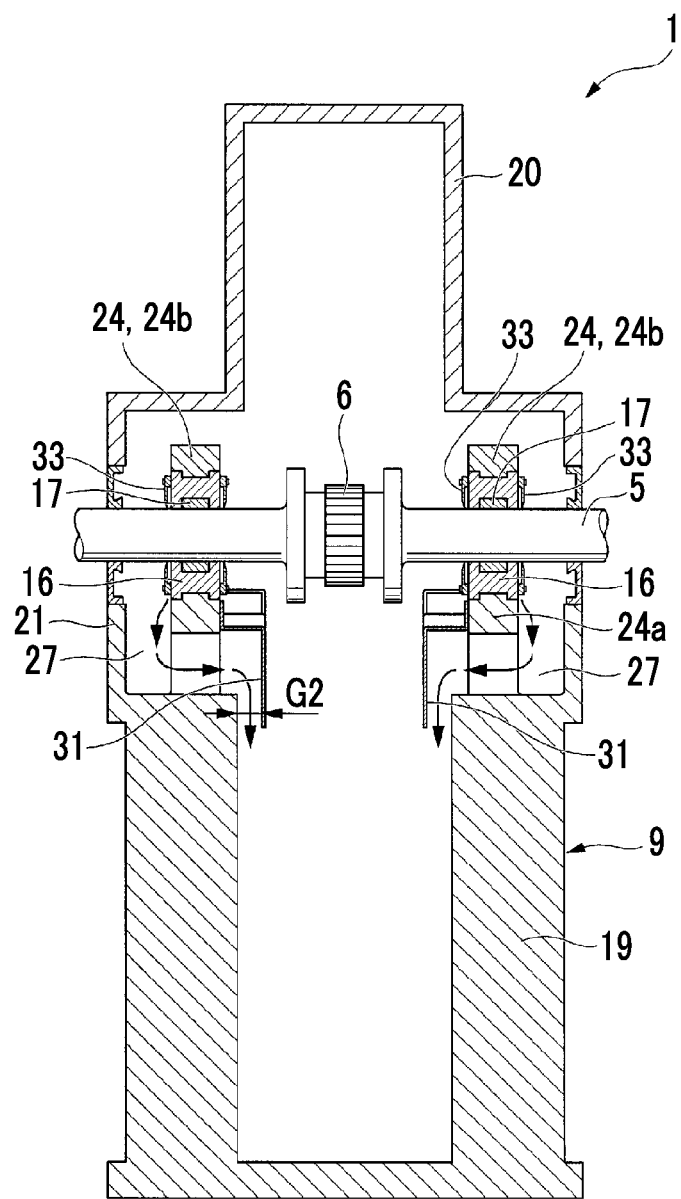
FIG. 4 is a sectional view taken along C-C of FIG. 2, and is a view illustrating the arrangement of third baffle plates.

The third baffle plates 31 are disposed between the lower half portions of the driven shaft bearings 16 and the gear wheel 4 so as to separate the driven shaft bearings 16 from the gear wheel 4. As illustrated in FIG. 4, the third baffle plates 31 are attached to the bearing fixing part lower half portions 24a for fixing the driven shaft bearings 16. The principal surfaces of the third baffle plates 31 are fixed to the bearing fixing part lower half portions 24a for fixing the driven shaft bearings 16 so as to be separated from the inner surface of the lower casing 19 by a predetermined dimension G2.

Figure 5:
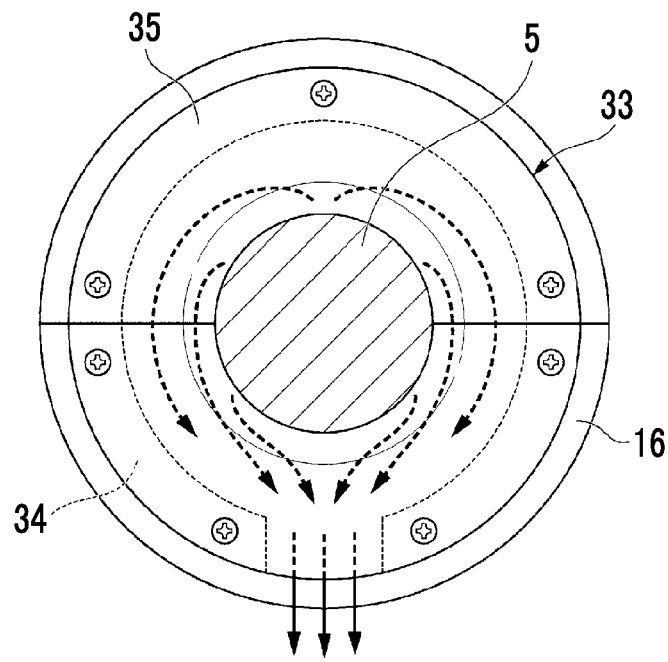
FIG. 5 is a front view of an oil thrower of the embodiment of the present invention, viewed in an axial direction.
Figure 6:
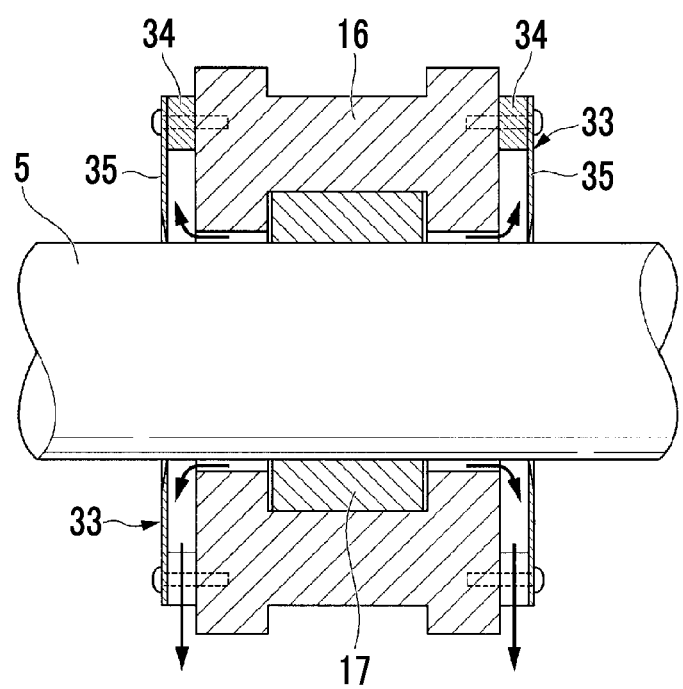
FIG. 6 is a sectional view of the oil throwers of the embodiment of the present invention.

As illustrated in FIGS. 5 and 6, oil throwers 33 for preventing the drain oil discharged from the bearings of the driven shafts 5 from scattering are attached to the driven shaft bearings 16. The oil throwers 33 are constituted by cut-out rings 34 having discharge ports formed by cutting the lower portions thereof, and covers 35 having a disk shape, and are attached to both sides of the driven shaft bearings 16 in the axial direction by fastening means such as bolts.

Next, the action of the geared compressor 1 of this embodiment will be described.

The operating fluid to be compressed is introduced into the first-stage compressing part 11, the second-stage compressing part 12, and the third-stage compressing part 13 in this order and is compressed. After the operating fluid is compressed by the third-stage compressing part 13, the operating fluid is supplied to a predetermined plant P which is a demander of the compressed operating fluid.

As illustrated in FIG. 3, the drain oil which is discharged from the driving shaft bearings 15 and is discharged toward the gear wheel 4 side abuts the first baffle plates 28 and thereafter flows toward the lower side via a section surrounded by the gear casing 9 and the first baffle plates 28. The drain oil which is discharged from the driving shaft bearings 15 and is discharged toward the opposite side of the gear wheel 4 flows toward the first baffle plates 28 via the oil grooves 27 and flows toward the lower side via a section surrounded by the first baffle plates 28.

The drain oil which is discharged from the driving shaft bearings 15 and is discharged while scattering upward, abuts the second baffle plates 30 and is not allowed to be scattered upward by the second baffle plates 30.

As illustrated in FIGS. 5 and 6, the drain oil which is discharged from the driven shaft bearings 16 is discharged toward the space surrounded by the cut-out rings 34 and the covers 35 of the oil throwers 33 and is discharged toward the lower side from the discharge ports in the lower portions of the cut-out rings 34. As illustrated in FIG. 4, the drain oil which is discharged via the oil grooves 27 and is discharged toward the gear wheel 4 side abuts the third baffle plates 31 and then flows downward.

According to this embodiment, the drain oil discharged from the driving shaft bearings 15 is prevented from falling and adhering onto the lower half portion of the gear wheel 4 by the first baffle plates 28. Accordingly, power loss that occurs due to the adhesion of the drain oil to the gear wheel 4 when the gear wheel 4 is rotated can be reduced, and thus the geared compressor 1 that needs low power for the rotational driving part 2 can be provided.

In addition, since the lower ends of the first baffle plates 28 extend further downward than the lower end of the gear wheel 4, the adhesion of the drain oil to the gear wheel 4 can be further prevented.

In addition, since the second baffle plates 30 are disposed between the upper half portions of the driving shaft bearings 15 and the gear wheel 4, the drain oil discharged toward the upper side from the driving shaft bearings 15 can be prevented from adhering to the gear wheel 4.

In addition, since the third baffle plates 31 are disposed between the lower half portions of the driven shaft bearings 16 and the gear wheel 4, the drain oil discharged from the driven shaft bearings 16 can be prevented from adhering to the gear wheel 4.

While the embodiment of the present invention has been described in detail with reference to the drawings, the configurations and combinations thereof in the embodiment are only examples, and additions, omissions, substitutions, and other changes in the configurations may be made without departing from the spirit of the invention. In addition, the present invention is not limited by the embodiment, and is limited only by the appended claims.

In addition, in the above-described embodiment, an example in which the baffle plates are applied to the geared compressor is used. However, the baffle plates can be applied to any rotary machine that includes a gear train constituted by a gear wheel and a pinion gear, and for example, can be applied to a turbine.

In addition, the geared compressor of the above-described embodiment has a configuration with three compressing parts. However, the embodiment is not limited thereto, and compressing parts may also be provided at both ends of two driven shafts.

In addition, the number of the pinion gears is not limited to two, and for example, a third pinion gear may also be disposed on the upper side of the gear wheel.

INDUSTRIAL APPLICABILITY

The present invention can be applied to a rotary machine such as a geared compressor or a turbine, which includes a gear train constituted by a gear wheel and a pinion gear.

REFERENCE SIGNS LIST 1 geared compressor
2 rotational driving part
3 driving shaft
4 gear wheel
5 driven shaft
5a lower-pressure-stage driven shaft
5b higher-pressure-stage driven shaft
6 pinion gear (pinion)
6a lower-pressure-stage pinion gear
6b higher-pressure-stage pinion gear
7 counterweight
8 pipe
9 gear casing
11 first-stage compressing part
12 second-stage compressing part
13 third-stage compressing part
14 impeller
15 driving shaft bearing
16 driven shaft bearing
17 bearing pad
19 lower casing
20 upper casing
21 flanged portion
23 first bearing fixing part
23a bearing fixing part lower half portion
23b bearing fixing part upper half portion
24 second bearing fixing part
24a bearing fixing part lower half portion
24b bearing fixing part upper half portion
27 oil groove
28 first baffle plate (first plate)
29 bent portion
30 second baffle plate (second plate)
31 third baffle plate (third plate)
33 oil thrower
34 cut-out ring
35 cover

The invention claimed is:

1. A rotary machine comprising:
a rotational driving part;
a driving shaft which is rotated by the rotational driving part about an axis that extends in a horizontal direction;
a gear wheel which is fixed to the driving shaft;
a bearing section which rotatably supports the driving shaft and is supplied with lubricating oil;
a plurality of pinions which mesh with the gear wheel to be driven;
a plurality of compressing parts which are provided to correspond to the plurality of pinions and are respectively rotated by the pinions; and
a first plate which is disposed between the bearing section and the gear wheel, and covers a region of at least a portion of a lower half of the gear wheel so as to separate the gear wheel from the bearing section;
a plurality of driven shaft bearing sections which rotatably support a plurality of driven shafts to which each of the plurality of pinion is fixed, respectively; and
a plurality of third plates corresponding to the plurality of driven shaft bearing sections respectively, each of the plurality of third plates being independently disposed apart from the first plate between a lower half portion of the driven shaft bearing section and the gear wheel to separate the gear wheel from the driven shaft bearing section, wherein
an upper end of the first plate is at the same position in height as the center of the driving shaft.

2. The rotary machine according to claim 1,
wherein a lower end of the first plate extends further downward than a lower end of the gear wheel.

3. The rotary machine according to claim 1, further comprising:
a second plate which is disposed between an upper half portion of the bearing section and the gear wheel to separate the gear wheel from the bearing section.

4. The rotary machine according to claim 1, further comprising:
a casing which supports the bearing section,
wherein the casing is provided with an oil groove which guides drain oil to one side of the bearing section in an axial direction of the driving shaft on which the first plate is disposed, wherein the drain oil is discharged from the bearing section toward the other side of thereof in the axial direction.

5. The rotary machine according to claim 1, wherein the first plate is provided with bent portions formed on both side in a lateral direction of the first plate so that the first plate is separated from the inner surface of the casing.

6. The rotary machine according to claim 4, wherein an oil thrower which is configured by a cut-out ring having a discharge port formed by cutting a lower portion thereof and a cover is attached to each side of the driven shaft bearing in a axial direction so as to allow the drain oil discharged from the driven shaft bearing to be discharged toward a space surrounded by the cut-out ring and the cover, to be discharged toward a lower side from the discharger port in a lower portion of the cut-out ring, and to abut the third plate via the oil groove.

7. The rotary machine according to claim 1, wherein the driven shaft being horizontally spaced from the driving shaft, and as seen in a plane orthogonal to the driven shaft, the plane being divided into four quadrants by the vertical straight line passing through the driven shaft and by the horizontal straight line passing through the driven shaft, the third plate is entirely disposed in the lower quadrant that is closest to the driving shaft.

* * * * *